United States Patent [19]

Takemoto et al.

[11] Patent Number: 4,883,858

[45] Date of Patent: Nov. 28, 1989

[54] THERMOSETTING RESIN FROM AMINE TERMINATED AMIC ACID AND BIS-MALEIMIDE

[75] Inventors: Masayuki Takemoto, Yokohama; Osamu Nagura, Chigasaki; Yukio Nomura; Minoru Yasuda, both of Yokohama, all of Japan

[73] Assignee: Nippon Oil and Fats Co., Ltd., Tokyo, Japan

[21] Appl. No.: 234,411

[22] Filed: Aug. 19, 1988

[30] Foreign Application Priority Data

Aug. 25, 1987 [JP] Japan .................. 62-211164
Jun. 28, 1988 [JP] Japan .................. 63-160362
Jul. 1, 1988 [JP] Japan .................. 63-164656

[51] Int. Cl.[4] .............. C08G 69/14; C08G 69/26; C08G 73/10
[52] U.S. Cl. .................. 528/322; 524/413; 524/592; 524/600; 524/606; 525/421; 525/436; 528/170; 528/172; 528/173; 528/184; 528/208; 528/220; 528/229; 528/321; 528/352; 528/353
[58] Field of Search .......... 528/322, 220, 229, 321, 528/208, 352, 353, 184, 188, 170, 172, 173; 524/592, 600, 606, 413; 525/421, 436

[56] References Cited

U.S. PATENT DOCUMENTS 4,560,742 12/1985 Pater .................. 528/322
4,600,770 7/1986 Gagliani et al. ............ 528/322

Primary Examiner—Harold D. Anderson
Attorney, Agent, or Firm—Flynn, Thiel, Boutell & Tanis

[57] ABSTRACT

A premix, an origomeric prepolymer obtainable from a limited addition polymerization effected with the premix and a thermosetting resin obtainable from such premix or prepolymer as well as fiber reinforced plastics made of such thermosetting resin which are excellent in the heat resistance, impact resistance and flexibility and exhibit a high toughness, wherein said premix comprises, as a first essential component, an amine-terminated amic acid expressed by the formula,

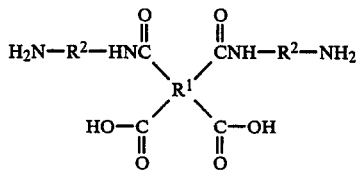

in which $R^1$ stands for a tetravalent aromatic residue having 6 to 20 carbon atoms and $R^2$ denotes a divalent organic residue having 2 to 20 carbon atoms, said amic acid being produced by reacting a tetracarboxylic dianhydride with a diamine compound, and, as a second essential component, an N,N'-bis maleimide of the formula,

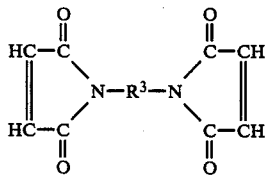

wherein $R^3$ denotes a divalent organic residue having 2 to 20 carbon atoms, the mole ratio of [N,N'-bis-maleimide]/[amine-terminated amic acid] being in the range from 1 to 3.

5 Claims, No Drawings

THERMOSETTING RESIN FROM AMINE TERMINATED AMIC ACID AND BIS-MALEIMIDE

BACKGROUND OF THE INVENTION

1. Field of the Invention

The present invention relates to a novel thermosetting resin as well as to fiber reinforced plastics made from such thermosetting resin as the matrix, which are excellent in the heat resistance, impact resistance and flexibility and also have high toughness.

2. Description of the Prior Art

Resins based on polyimide exhibit, in general, superior physical and chemical properties, such as, high heat resistance and high stability against chemicals etc., so that they have many uses, such as, films, coatings on electric cables and wires, plyed or laminated boards and sheets, paints, adhesives, and formed articles for industrial and domestic uses at higher temperatures. Among the resins based on polyimide, aromatic polyimide resins and polyamide-imide resins are both superior in the mechanical properties and heat resistance, while they have some deficiency processibility, so that their applications had been limited only to films and insulator coatings for electric wires. Employment of these resins for molding shaped articles and for manufacturing laminated boards (multilayered boards) had been limited only to a quite specific case, because conventional processing apparatuses generally employed for phenol resins, epoxy resins and so on, cannot be used, as such, due to the necessity of high temperature and high pressure for processing these polyimide resins and, thus, these latter resins require an installation specifically designed therefor.

On the other hand, resins based on aromatic bismaleimide, which also are thermosetting in nature, have widely been employed in industry, since they exhibit superior heat resistance and excellent moldability. Thermosetting resins based on aromatic bismaleimide have the defects of inferior impact resistance and poor flexibility.

In order to improve the low impact resistance and the poor flexibility of aromatic bismaleimide resins, an attempt had been proposed to incorporate an aromatic diamine compound together with the aromatic bismaleimide. Thus, a resin based on polyaminobismaleimide [e.g. Kerimide (trademark), a product of the firm Rhone-Poulenc S.A.] produced from N,N'-4,4'-diphenylmethane bismaleimide and 4,4'-diaminodiphenylmethane is superior in impact resistance and in flexibility as compared with those made from an aromatic bismaleimide alone, as disclosed in the Japanese Patent Publication Nos. 23250/1971 and 5959/1977. This thermosetting resin also has been shown to be not satisfactory in its impact resistance and flexibility.

Fiber reinforced plastics made of these polyimide resins have also a disadvantage that the mechanical strength to be expected by the incorporation of reinforcement fiber may not be revealed sufficiently, since there is considerable difference between the matrix resin and the reinforcement fiber in thermal expansion, especially when carbon fiber or aramid fiber is employed for the reinforcment, thus causing formation of microcracks in the final molded articles at around the interface between the fiber and the matrix resin due to the shrinkages and expansions that are encountered during the course of polymerization of the resin and processing works in and out of the mold involving considerable temperature changes by heating and cooling.

SUMMARY OF THE INVENTION

An object of the present invention is to provide a thermosetting resin which has a high impact resistance, high flexibility and high toughness, while retaining the superior heat resistance inherent to a polyaminobismaleimide resin.

Another object of the present invention is to provide fiber reinforced plastics having superior mechanical properties and excellent heat resistance in which the formation of microcracks at around the interface of the matrix resin and the fiber is minimized.

According to one aspect of the present invention, there is provided a premix for a thermosetting resin comprising, as a first essential component, an amine-terminated amic acid expressed by the formula (I).

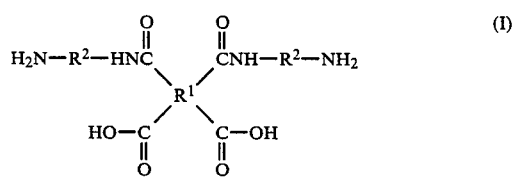

in which $R^1$ stands for a tetravalent aromatic residue having 6 to 20 carbon atoms and $R^2$ denotes a divalent organic residue having 2 to 20 carbon atoms, said amic acid being produced by reacting a tetracarboxylic dianhydride represented by the formula (II),

wherein $R^1$ has the same meaning as defined above, with a diamine compound represented by the formula (III),

wherein $R^2$ has the same meaning as defined above, and, as a second essential component, an N,N'-bismaleimide of the formula (IV),

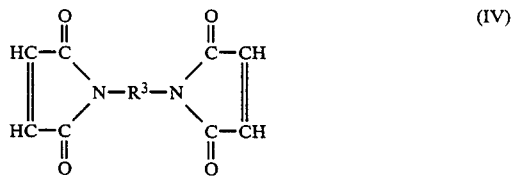

wherein $R^3$ denotes a divalent organic residue having 2 to 20 carbon atoms, the mole ratio of [N,N'-bismaleimide]/[amine-terminated amic acid] being in the range from 1 to 3.

According to the second aspect of the present invention, there is provided a prepolymer for a thermosetting resin, which comprises a product of a limited addition polymerization effected with the premix as mentioned above.

According to the third aspect of the present invention, there is provided a thermosetting resin which comprises a cured polymerization product resulting from an addition polymerization effected either with the premix given above or with the above-mentioned prepolymer.

The fourth aspect of the present invention proposes fiber-reinforced resin products which comprise a reinforcement ingredient of fiber and a thermosetting matrix resin consisting essentially of a cured polymerization product obtained by polymerization effected either using the premix or using the prepolymer as given above.

DETAILED DESCRIPTION OF THE INVENTION

For the tetracarboxylic dianhydride represented by the formula (II), there may be enumerated, for example, 3,3',4,4'-benzophenonetetracarboxylic dianhydride, pyromellitic dianhydride, 2,3,6,7-naphthalenetetracarboxylic dianhydride, 3,3',4,4'-diphenyltetracarboxylic dianhydride, 2,2-bis(3,4-dicarboxyphenyl)-propane dianhydride, bis(3,4-di-carboxyphenyl)-ether dianhydride, 2,6-dichloronaphthalene-1,4,5,8-tetracarboxylic dianhydride, phenanthrene-1,8,9,10-tetracarboxylic dianhydride, 1,1-bis(2,3-dicarboxyphenyl)-ethane dianhydride, bis(3,4-dicarboxyphenyl)-methane dianhydride, bis(3,4-dicarboxyphenyl)-sulfone dianhydride, 1,1,1,3,3,3-hexafluoro-2,2-bis(3,4-dicarboxyphenyl)-propane dianhydride and so on. They may be employed alone or in mixture of two or more of them. Most preferably, 3,3',4,4'-benzophenonetetracarboxylic dianhydride is used.

For the diamine compound represented by the formula (III), there may be enumerated, for example, 4,4'-diaminodiphenylmethane, 4,4'-diaminodiphenylpropane, 4,4'-diaminodiphenyl sulfide, 3,3'-diaminodiphenyl sulfone, 4,4'-diaminodiphenyl ether, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-dimethyl-4,4'-diaminodiphenyl ether, 3,3'-diethoxy-4,4'-diaminodiphenylsulfone, 3,3'-diethyl-4,4'-diaminodiphenylpropane, 3,3'-dimethyl-4,4'-diaminobenzophenone, 3,3'-diaminodiphenylmethane, 3,3'-diaminodiphenyl ether, 2,4-diaminotoluene, 2,6-diaminotoluene, 2,4-diaminoanisole, 2,4-diamino-monochlorobenzene, 2,4-diamino-fluorobenzene, m-phenylenediamine, p-phenylenediamine, m-xylylenediamine, p-xylylenediamine, 3,3'-diaminobenzophenone, 1,3-bis(3-aminophenoxy)-benzene, 9,9-bis(4-aminophenyl)-fluorene and so on. They can be employed alone or in mixture of two or more of them. 4,4'-diaminodiphenylmethane may preferably may be employed.

Examples of the N,N'-bismaleimide of the formula (IV) include N,N'-ethylenebismaleimide, N,N'-m-phenylenebismaleimide, N,N'-p-phenylenebismaleimide, N,N'-hexamethylenebismaleimide, N,N'-4,4'-diphenylmethanebismaleimide, N,N'-4,4'-diphenyletherbismaleimide, N,N'-4,4'-diphenylsulfonebismaleimide, N,N'-dicyclohexylmethanebismaleimide, N,N'-m-xylylenebismaleimide, N,N'-(3,3'-dichloro-4,4'-bisphenylene)-bismaleimide and N,N'-(3,3'-diphenyloxy)-bismaleimide. They can be employed alone or in mixture of two or more of them. N,N'-4,4'-diphenylmethanebismaleimide may preferably be employed.

For obtaining the novel thermosetting resin according to the present invention, it is possible to start either with a premix consisting of an amine-terminated amic acid of the formula (I) and an N,N'-bismaleimide of the formula (IV) or with a prepolymer prepared preliminarily by a limited addition polymerization of an amine-terminated amic acid of the formula (I) with an N,N'-bismaleimide of the formula (IV).

For synthesizing the amine-terminated amic acid of the formula (I) to be employed in the above-mentioned premix, it is preferable to proceed as follows:

A diamine compound expressed by the formula (III) is dissolved in an organic solvent, preferably in an amide solvent, such as, N-methyl-2-pyrrolidone, N,N-dimethylacetamide, N,N-dimethylformamide or so on, and thereto is added dropwise a solution of a selected tetracarboxylic dianhydride of the formula (II) in the same solvent, whereupon the mixture is agitated at a temperature in the range from room temperature to about 50° C. for a period from about 30 minutes to about 3 hours to obtain the contemplated amic acid. The reaction may be effected using at least two moles of the diamine per one mole of the tetracarboxylic dianhydride, while it is preferable to choose a mole ratio of the former to the latter of 3 to 5 for improving the purity of the product. After the reaction, the reaction mixture is introduced into a large amount of water and the thereby coagulated precipitate is separated by filtration. The filter cake is washed with acetone, methanol or so on, in order to remove the unreacted excess of the diamine, whereupon the so washed mass was dried (under a reduced pressure) to obtain the amine-terminated amic acid of the formula (I) in a pulverous form.

The premix is prepared by mixing the thus obtained pulverous amine-terminated amic acid of the formula (I) with a N,N'-bismaleimide expressed by the formula (IV), wherein the mole ratio of the N,N'-bismaleimide to the amine-terminated amic acid is to be chosen within the range of from 1 to 3. If the mole ratio is less than 1, the heat resistance of the thermosetting resin product obtained therefrom will be insufficient and, if this is higher than 3, the cross-linkage concentration in the resin product becomes too high, resulting in an occurrence of microcracks to thereby deteriorate the mechanical properties.

An amine-terminated amic acid of the formula (I) to be employed for the production of the prepolymer according to the present invention described previously may be prepared as follows:

A diamine compound expressed by the formula (III) is dissolved in an organic solvent, preferably in an amide solvent, such as, N-methyl-2-pyrrolidone, N,N-dimethylacetamide, N,N-dimethylformamide or so on, and thereto is added dropwise a solution of a selected tetracarboxylic dianhydride of the formula (II) in the same solvent, whereupon the mixture is agitated at a temperature in the range from room temperature to about 50° C. for a period from about 30 minutes to about 3 hours to obtain the contemplated amic acid.

In order to prepare the prepolymer according to the present invention by a limited addition polymerization of the amine-terminated amic acid of the formula (I) with the N,N'-bismaleimide of the formula (IV), a selected N,N'-bismaleimide represented by the Formula (IV) is added to a solution of a selected amine-terminated amic acid expressed by the formula (I) prepared as above. It is preferable to choose the mole ratio of the N,N'-bismaleimide to the amine-terminated amic acid within a range of [N,N'-bismaleimide]/[amine-terminated amic acid] of from 1 to 3. If this ratio is less than 1, the heat resistance of the thermosetting resin product obtained therefrom will be insufficient and, if this is higher than 3, the cross-linkage concentration in the resin product becomes too high, resulting in an occurrence of microcracks to thereby deteriorate the mechanical properties.

The conditions of the limited addition polymerization of the amine-terminated amic acid of the formula (I) with the N,N'-bismaleimide of the formula (IV) for obtaining the prepolymer may be effected at a temperature in the range from 80° to 140° C. for a reaction duration in the range from about 0.5 to about 3 hours to obtain the contemplated prepolymer.

If the reaction temperature is lower than 80° C., the Michael addition reaction of the amine with the maleimide will not proceed sufficiently, whereas a reaction temperature above 160° C. may cause an excessive imidization due to dehydration of the amine-terminate amic acid, resulting in a decrease in the solubility of the reaction product in the solvent, whereby the oligomeric product formed will become separated from the solvent inside the reaction solution. In order to isolate the oligomeric reaction product in a pulverous form from the reaction mixture, the reaction mixture is introduced into a non-solvent, such as, water, methanol, acetone or so on, preferably in methanol, so as to cause precipitation of the oligomeric product. The thus precipitated reaction product is separated by filtration and is dried (under a reduced pressure) into a pulverous prepolymer mass.

For special uses, such as, preparation of a prepreg using a fiber cloth and formulation of enamel varnishes, paint compositions and adhesives, the reaction solution after the limited addition polymerization may be employed as such.

The premix and the prepolymer prepared as described above may be employed for producing a thermosetting resin exhibiting excellent mechanical and chemical properties with high heat resistance. Here, it is permitted to incorporate in the resin a curing accelerator for lowering the curing temperature or for decreasing the molding time.

As the curing accelerator, tertiary amines, imidazoles, peroxides and so on may be employed. Examples of the tertiary amines include trialkylamines having in the alkyl group 1-14 carbon atoms, such as, trimethylamine, triethylamine, tripropylamine and tributylamine; N,N-dimethylbenzylamine; N,N,N',N'-tetramethylethylenediamine; N,N-diethylcyclohexylamine; N-methylmorpholine; N-methylpiperidine; 1,4-diazabicyclo[2.2.2.]octane (DABCO); 1,8-diazabicyclo[5.4.0]undecene-7 (DBU) and so on.

For the imidazoles, there may be enumerated, for example, 2-methylimidazole, 2-phenylimidazole, 2-ethyl-4-methylimidazole and so on.

For the peroxides, there may be enumerated, for example, benzoyl peroxide, tert-butyl perbenzoate and the like.

It is permissible to incorporated in the premix or in the prepolymer as well as in the thermosetting resin according to the present invention one or more of conventional additives, such as, antioxidant, heat stabilizer, UV-absorber, fire retardant, antistatic agent, lubricant, coloring agent and so on, each in an amount within a limit such that it does not obstruct the object of the present invention.

It is also possible to include in the starting mass for, such as, moldings, laminated boards, reinforced materials and so on, of the thermosetting resin according to the present invention, various other thermosetting resins, such as, phenol resins, epoxy resins and so on; various thermoplastic resins, such as, polyethylene, polypropylene, polyamides, polycarbonates, polysulfones, polyethersulfones, polyetherketones, polyetheretherketones, modified polyphenylene oxides, polyphenylene sulfides and so on; fibrous reinforcment materials, such as, glass fiber, carbon fiber, fibers of aromatic polyamides, alumina whisker, potassium titanate whisker and so on; fillers, such as, pulverous clay, flaky mica, silica powder, graphite powder, glass beads, pulverous tetrafluoroethylene, pulverous molybdenum disulfide, alumina powder, calcium carbonate powder and so on, each in an adequate amount in accordance with each specific effect contemplated.

In the case of production of formed articles by molding, it may be permitted to incorporate a mold release agent, for example, metallic soaps, such as, cobalt naphthenate, higher fatty acids, such as, stearic acid and so on, silicone resins, fatty acid amides and so on.

The premix, the prepolymer and the thermosetting resin according to the present invention can be processed into, for example, films, coatings on electric wires and cables, paint compositions, adhesives and fiber reinforced resin products.

The fiber reinforced plastcs products according to the present invention may be produced by combining the premix or the prepolymer according to the invention with a fiber reinforcement ingredient amd subjecting the so obtained mixture to polymerization with heating under a pressure. For the fiber reinforcement ingredient, for example, short and long filament fibers of glass, carbon, aramid resin, alumina and potassium titanate, as well as woven and unwoven cloths made of such fiber are employed. It is possible to use one or more of these fiber reinforcement ingredients in one and the same product. The material of reinforcement may consist of either a short or long filament fiber. In case where chopped fiber is employed, it is preferable to use those of short filament cut into an average filament length of 1-100 mm, preferably 3-50 mm. If the filament length is less than 1 mm, the improvement in the mechanical strength of the plastics product due to the incorporation of the reinforcement fiber will not be sufficient, whereas the employment of a fiber reinforcement having an average filament length greater than 100 mm will cause a deterioration in the flowability (moldability) of the molding mass during the molding and may have a tendency to form voids inside the plastics product obtained.

The amount of the fiber reinforcement ingredient to be employed may range from 10 to 200 parts by weight, preferably from 30 to 150 parts by weight per 100 parts by weight of the resin. If the amount of the fiber reinforcement ingredient in the plastics product is short of 10 parts by weight per 100 parts by weight of the matrix resin, no sufficient improvement in the mechanical strength will be expectable and, if it is greater than 200 parts by weight, the moldability becomes worse with simultaneous increase in the tendency to form voids within the plastics product.

For manufacturing the fiber reinforced plastics moldings according to the present invention, the following procedures may be pursued:

Either a premix or a prepolymer prepared in the manner described above can be employed for preparing the raw molding mixture. When a pulverous premix or prepolymer is employed, it is first dry blended with an adequate amount of short filament reinforcement fiber in a mixer and the mixture is then subjected to a heat treatment at about 140°–170° C. in order to convert the premix into a prepolymer suitable for molding in a conventional molding apparatus. It is also possible to prepare a so-called bulk molding compound using a fusedly dissolved solution of a prepolymer in an adequate solvent. It is furthermore possible to prepare a prepreg by impregnating a woven or unwoven fiber cloth with the product solution of the premix or the prepolymer according to the invention per se before isolating as the pulverous product or, occasionally, with a solution prepared by further diluting such product solution by an appropriate solvent, such as N,N-dimethylformamide, to reach an adequate viscosity. From the so obtained prepreg, fiber reinforced laminated plastics boards and sheets can be produced by press molding, vacuum press molding or molding in an autoclave or so on.

The thus produced fiber reinforced plastics products according to the present invention have an excellent heat resistance and exhibit more superior mechanical properties together with high toughness as compared with those of the conventional reinforced plastics of polyaminobismaleimide.

The thermosetting resin according to the present invention is superior in its impact resistance, flexibility and toughness as compared with those of the conventional aromatic bismaleimide resins. Especially, the resin obtained by curing the prepolymer according to the present invention is excellent.

Since the fiber reinforced plastic made from the thermosetting resin according to the present invention has a high heat resistance without occurence of microcracks at around the interface between the reinforcement fiber and the matrix resin and the mechanical properties are quite excellent, so that it is suitable for use for materials for the electric and electronic instruments and apparatuses, for airplane and aerospace instruments and apparatuses, for the construction elements, machine parts in automotive and mechanical industries, sliding parts and so on. It is possible especially to use the fiber reinforced plastics according to the present invention for construction parts requiring high strength and high elasticity, for which conventional material have been not suited.

DETAILED DESCRIPTION OF THE PREFERRED EMBODIMENTS

Below, the present invention will further be described concretely with reference to the preferred embodiments by way of Examples and Comparison Examples. It is not intended to restrict in any sense the spirit and scope of the present invention by these specific Examples.

PRODUCTION EXAMPLES 1–3

In a three-necked 300 ml flask equipped with a stirrer, a dropping funnel and a calcium chloride desiccator tube, there was charged a solution prepared by dissolving 0.2 mole of a diamine compound as denoted in Table 1 below in 40 ml of dried dimethylacetamide and thereto was added dropwise a solution prepared by dissolving 0.05 mole of a tetracarboxilic dianhydride, as given also in Table 1 below, in 100 ml of dimethylacetamide from the dropping funnel, at room temperature, over 1 hour, while agitating the ingredients. After the dropping was over, the mixture was further agitated for 3 hours at room temperature. This solution was introduced into 1 liter of water and the thereby formed coagulated precipitate was separated by filtration and the precipitate was washed with acetone under reflux. This was filter again and the filtered cake was dried under a reduced pressure of at highest 10 mmHg at 25° C. for 5 hours to obtain pale yellow powder. The results of the synthesis are summarized in Table 1.

TABLE 1

| Production Example No. | Diamine (III) used (Amount of Charge in g) | Acid Dianhyd. (II) used (Amount of Charge in g) | Yield (%) |
|---|---|---|---|
| 1 | MDA[*1] (39.7) | BTDA[*3] (16.1) | 94 |
| 2 | ODA[*2] (40.1) | BTDA (16.1) | 95 |
| 3 | MDA (39.7) | PMDA[*4] (10.9) | 95 |

Notes: [*1] 4,4'-Diaminodiphenylmethane
[*2] 4,4'-Diaminodiphenyl ether
[*3] 3,3',4,4'-Benzophenonetetracarboxilic dianhydride
[*4] Pyromellitic dianhydride

EXAMPLES 1–10

Using various short filament fiber products, premix samples were prepared each by blending fiber product with a pulverous mixture of an N,N'-bismaleimide as notified in Table 2 below with an amine-terminated amic acid given also in Table 2 below at 140° C. so as to cause the fiber product to be impregnated with said mixture. This premix was charged in a metal mold heated at 230° C. and molding was performed under a pressure of 160 kgf/cm² for 30 minutes to obtain a fiber reinforced plastics product. The composition of each blend and the material properties of the thus obtained plastics product are summarized in Table 2.

TABLE 2

| | Particulars of Resin Constituents | | | | | | Properties of the Plastics Product | | | | |
|---|---|---|---|---|---|---|---|---|---|---|---|
| Example No. | Amine-Terminated Amic Acid (I) according to | N,N'—Bis-maleimide (IV) used | Mole Ratio of (IV)/(I) | Weight Ratio of (IV)/(I) | Reinf. Fiber and Filament Length (mm) | Wt. Amount of Fiber (Part/100 Parts of Resin) | Flexural Strength (kgf/mm²)[*6] | Tensile Strength (kgf/mm²)[*7] | Izod Imp. Strength (Notch) (kgf·cm/cm²)[*8] | Retention of Flex. Strength (%)[*9] | Occurrence of Microcracks |
| 1 | Production Example 1 | BMI[*1] | 2/1 | 0.997/1.000 | CF[*2] (6.4) | 50 | 21.3 | 9.1 | 4.3 | 80 | None |
| 2 | Production Example 1 | BMI | 2/1 | 0.997/1.000 | GF[*3] (6.4) | 50 | 18.5 | 8.6 | 4.9 | 79 | None |
| 3 | Production Example 1 | BMI | 2/1 | 0.997/1.000 | AF[*4] (6.4) | 50 | 10.4 | 5.5 | 4.9 | 77 | None |
| 4 | Production Example 1 | BMI | 1.5/1 | 0.748/1.000 | CF (6.4) | 50 | 16.1 | 8.2 | 5.3 | 78 | None |
| 5 | Production Example 1 | BMI | 1/1 | 0.499/1.000 | CF (6.4) | 50 | 11.3 | 5.5 | 5.5 | 73 | None |

TABLE 2-continued

| | | Particulars of Resin Constituents | | | | | Properties of the Plastics Product | | | | |
|---|---|---|---|---|---|---|---|---|---|---|---|
| Example No. | Amine-Terminated Amic Acid (I) according to | N,N'—Bis-maleimide (IV) used | Mole Ratio of (IV)/(I) | Weight Ratio of (IV)/(I) | Reinf. Fiber and Filament Length (mm) | Wt. Amount of Fiber (Part/100 Parts of Resin) | Flexural Strength (kgf/mm²)(*6) | Tensile Strength (kgf/mm²)(*7) | Izod Imp. Strength (Notch) (kgf·cm/cm²)(*8) | Retention of Flex. Strength (%)(*9) | Occurrence of Microcracks |
| 6 | Production Example 1 | OMI(*5) | 2/1 | 1.003/1.000 | CF (6.4) | 50 | 23.5 | 8.8 | 3.2 | 81 | None |
| 7 | Production Example 2 | BMI | 2/1 | 0.992/1.000 | CF (6.4) | 50 | 22.4 | 8.9 | 3.9 | 83 | None |
| 8 | Production Example 3 | BMI | 2/1 | 1.166/1.000 | CF (6.4) | 50 | 28.1 | 7.5 | 2.1 | 85 | None |
| 9 | Production Example 1 | BMI | 2/1 | 0.997/1.000 | CF (6.4) | 80 | 23.7 | 8.4 | 3.2 | 81 | None |
| 10 | Production Example 1 | BMI | 2/1 | 0.997/1.000 | CF (25.6) | 50 | 22.0 | 9.3 | 3.7 | 80 | None |

Note:
(*1): N,N'—4,4'-diphenylmethanebismaleimide
(*2): Carbon fiber, chopped from Torayca T300 #6343 (trademark) or the firm Toray Industries, Ltd.
(*3): Glass fiber, chopped from Glasron MS253B 1040 2NT 10AS (trademark) of the firm Asahi Fiber Glass Co., Ltd.
(*4): Aramid fiber, chopped from Conex CO1910 (trademark) of the firm Teijin Limited.
(*5): N,N'—4,4'-diphenyl ether bismaleimide
(*6): JIS K-6911
(*7): JIS K-6911
(*8): JIS K-7110
(*9): % retention = 100 × (observed flexural strength at 200° C.)/(observed flexural strength at 20° C.)

As shown in Table 2, the molded products of all the Examples 1-10 exhibited superior material properties showing a remarkable improvement especially in the impact strength. There was found no microcracks inside the plastics material even by the inspection under a microscope.

COMPARISON EXAMPLES 1-3

Using a resin of N,N'-diphenylmethanebismaleimide/4,4'-diaminodiphenylmethane=2/1 (mole ratio) [a commercial product Kerimide 601 (trademark) of the firm Rhone-Poulenc S. A.], molded products were produced under the same molding condition as in Examples 1-10. The material properties of the thus molded plastics were determined, which are summarized in Table 3. Inspection of the material of the molded plastics under a microscope showed occurrence of microcracks at around the interface between the reinforcement fiber and the matrix resin.

Comparison Examples 1-3 where microcrack formation was recognized, and since the values for the flexural strength, tensile strength and Izod impact strength are improved in the products according to the present invention markedly.

EXAMPLES 11-18

In a three-necked 300 ml flask equipped with a stirrer, a dropping funnel and a calcium chloride desiccator tube, there was charged a solution prepared by dissolving 0.2 mole of a diamine compound as notified in Table 4 below in 40 ml of dried dimethylacetamide and thereto was added dropwise a solution prepared by dissolving 0.1 mole of a tetracarboxylic dianhydride as given also in Table 4 below in 100 ml of dimethylacetamide from the dropping funnel at room temperature over 1 hour while agitation. After the dropping was over, the mixture was further agitated for 3 hours at room temperature. To this solution was added an N,N'-bismaleimide as given in Table 4 and the reaction was

TABLE 3

| | | Particulars of Resin Constituents | | | | | Properties of the Plastics Product | | | | |
|---|---|---|---|---|---|---|---|---|---|---|---|
| Compar. Example No. | Diamine (III) used | N,N'—bis-maleimide (IV) used | Mole Ratio of (IV)/(III) | Weight Ratio of (IV)/(III) | Reinf. Fiber and Filament Length (mm) | Wt. Amount of Fiber (Part/100 Parts of Resin) | Flexural Strength (kgf/mm²)(*6) | Tensile Strength (kgf/mm²)(*7) | Izod Imp. Strength (Notch) (kgf·cm/cm²)(*8) | Retention of Flexur. Strength (%)(*9) | Occurrence of Microcracks |
| 1 | MDA(*10) | BMI(*1) | 2/1 | 3.615/1.000 | CF(*2) (6.4) | 50 | 17.4 | 5.2 | 1.9 | 87 | Found |
| 2 | MDA | BMI | 2/1 | 3.615/1.000 | GF(*3) (6.4) | 50 | 14.7 | 4.6 | 2.0 | 84 | Found |
| 3 | MDA | BMI | 2/1 | 3.615/1.000 | CF (25.6) | 50 | 23.1 | 4.3 | 0.9 | 88 | Found |

Note:
(*1): N,N'—4,4'-diphenylmethanebismaleimide
(*2): Carbon fiber, chopped from Torayca T300 #6343 (trademark) or the firm Toray Industries, Ltd.
(*3): Glass fiber, chopped from Glasron MS253B 1040 2NT 10AS (trademark) of the firm Asahi Fiber Glass Co., Ltd.
(*6): JIS K-6911
(*7): JIS K-6911
(*8): JIS K-7110
(*9): % retention = 100 × (observed flexural strength at 200° C.)/(observed flexural strength at 20° C.)
(*10): 4,4'-Diaminodiphenylmethane As is clear from Tables 2 and 3, the fiber reinforced plastics products according to the present invention are more valuable for industrial uses, since the products according to the invention do not cause formation of microcracks, as contrasted to the prior art products of effected at 120° C. for 1 hour. After completion of the reaction, the reaction solution was introduced into 1 liter of methanol and the thereby formed precipitate of the oligomeric addition polymerization product was separated by filtration and was washed with methanol. This was filtered again and the filtered cake was dried under a reduced pressure of at highest 10 mmHg at 25° C. for 5 hours, followed by crushing in a mortar and sieving on a 60-mesh sieve, whereby a pale yellow powdery prepolymer product was obtained. Particulars of the prepolymer production including its yield and the elementary analysis data of each prepolymer obtained are summarized in Table 4

The thus obtained prepolymer powder was charged in a metal mold heated at a temperature of 200° C. and was press-molded under a pressure of 50 kgf/cm² over a molding time of 30 minutes. Then, the mold was cooled to room temperature and the molded green product was taken out of the mold, which was then subjected to a post curing in a hot blast gear oven at 250° C. for 4 hours. The material properties of the resulting plastics product are also summarized in Table 4.

COMPARISON EXAMPLE 4

Using a resin of N,N'-diphenylmethanebismaleimide/4,4'-diaminodiphenylmethane=2/1 (mole ratio) [a commercial product Kerimide 601 (trademark) of the firm Rhone-Poulenc S. A.], molded products were produced under the same molding condition as in Example 11. The material properties of the thus molded plastics were determined, which are summarized in Table 4.

TABLE 4

| Example or Comp. Example No. | Condition of Preparation of Prepolymer ||||||| Elementary Analysys ||| Izod Imp. Stength (without Notch)(3) (kgf·cm/cm²) | Properties of the Plastics Product ||||
|---|---|---|---|---|---|---|---|---|---|---|---|---|---|---|
| | Diamine (Amount in g) | Acid Dianhyd. Amount in g | Compound (IV)(1) (Amount in g) | Mole Ratio of (IV)/I(2) | Wt. Ratio of (IV)/I | Yield in g (in %) | C Found (Calc.) (%) | H Found (Calc.) (%) | N Found (Calc.) (%) | | Flexural Strength(4) (kgf/cm²) | Flexural Elastic Modulus (kgf/cm²) | Heat Distortion Temp.(6) (°C.) | 10% wt. Loss Temp. in Air(7) (°C.) | Storage Stability(8) |
| Exam. 11 | MDA(9) 39.7 | BTDA(10) 32.2 | BMI(11) 71.7 | 2/1 | 0.997/1.000 | 146.5 (98) | 71.63 (71.32) | 3.87 (4.08) | 7.95 (7.38) | 17 | 1210 | 35200 | 300< | 430 | no change |
| Exam. 12 | MDA 39.7 | BTDA 32.2 | BMI 53.8 | 1.5/1 | 0.748/1.000 | 114.4 (91) | 71.01 (71.38) | 3.82 (4.09) | 7.95 (7.83) | 18 | 1240 | 34900 | 300< | 418 | no change |
| Exam. 13 | MDA 39.7 | BTDA 32.2 | BMI 35.9 | 1/1 | 0.499/1.000 | 88.4 (82) | 71.28 (71.45) | 3.93 (4.11) | 7.81 (7.83) | 17 | 1150 | 33800 | 300< | 400 | no change |
| Exam. 14 | MDA 39.7 | BTDA 32.2 | OMI(12) 36.3 | 2/1 | 1.003/1.000 | 106.0 (98) | 69.93 (69.45) | 3.62 (3.79) | 7.91 (7.81) | 14 | 1310 | 36800 | 300< | 434 | no change |
| Exam. 15 | ODA(13) 40.1 | BTDA 32.2 | BMI 71.7 | 2/1 | 1.003/1.000 | 142.6 (99) | 69.38 (69.45) | 3.56 (3.79) | 7.97 (7.81) | 15 | 1220 | 36600 | 300< | 438 | no change |
| Exam. 16 | MDA 39.7 | PMDA(14) 21.8 | BMI 71.7 | 2/1 | 1.116/1.000 | 126.5 (95) | 70.38 (70.58) | 4.03 (4.10) | 8.26 (8.44) | 13 | 1280 | 37400 | 300< | 437 | no change |
| Exam. 17 | MDA 39.7 | BTDA 32.2 | BMI 107.6 | 3/1 | 1.496/1.000 | 174.1 (97) | 71.50 (71.21) | 3.94 (4.07) | 7.91 (7.83) | 13 | 1240 | 38400 | 300< | 440 | no change |
| Example 18 | MDa 39.7 | BTDA 32.2 | BMI 71.7 | 2/1 | 0.997/1.000 | 142.2 (99) | 71.30 (71.32) | 3.83 (4.08) | 7.81 (7.83) | 15 | 1290 | 36100 | 300< | 435 | no change |
| Comp. Examp. 4 | MDA 19.8 | — | BMI 71.7 | 2/1(15) | 3.615(16) | 77.8 (85) | 72.81 (72.20) | 4.34 (4.63) | 9.02 (9.20) | 10 | 910 | 37000 | 300< | 410 | gelled after 3 Days |

Note:
(1)N,N'—bismaleimide as represented by the formula (IV)
(2)Mole ratio of [N,N'—bismaleimide]/[Amine-terminated Amic Acid]
(3)ASTM D-255
(4)ASTM D-790
(5)ASTM D-790
(6)JIS K-7207
(7)Determined using a calorimeter Model DT-30 (trade name) of the firm Shimadzu Corporation at a temperature elevation rate of 10° C./min.
(8)Examined for a 50 wt. = % solution of the thermosetting resin in N—methyl-2-pyrrolidone over a period of one week.
(9)4,4'-Diaminodiphenylmethane
(10)3,3',4,4'-Benzophenonetetracarboxylic dianhydride.
(11)N,N'—4,4'-diphenylmethanebismaleimide
(12)N,N'—4,4'-diphenyl ether bismaleimide
(13)4,4'-Diaminodiphenyl ether
(14)Pyromellitic dianhydride
(15)Mole ratio of [N,N'—bismaleimide]/[Diamine]
(16)Weight ratio of [N,N'—bismaleimide]/[Diamine]

As is clear from Table 4, the plastics products of Examples 11-18 are more valuable for industrial uses, since the products showed improvement in the mechanical properties, such as, the flexural strength, flexural elastic modulus, Izod impact strength and heat stability, as compared with those of the prior art product of Comparison Example 4. Moreover, it was confirmed that the storage stability in the form of resin solution was increased for the products according to the invention.

EXAMPLES 19-32

In a three-necked 300 ml flask equipped with a stirrer, a dropping funnel and a calcium chloride desiccator tube, there was charged a solution prepared by dissolving 0.2 mole of a diamine compound as notified in Table 5 below in 40 ml of dried dimethylacetamide and thereto was added dropwise a solution prepared by dissolving 0.1 mole of a tetracarboxylic dianhydride as given also in Table 5 below in 100 ml of dimethylacetamide from the dropping funnel at room temperature over 1 hour while agitating the ingredients. After the dropping was over, the mixture was further agitated for 3 hours at room temperature. To this solution was added an N,N'-bismaleimide as given in Table 5 and the reaction was conducted at 120° C. for 1 hours. After completion of the reaction, the reaction solution was introduced into 1 liter of methanol and the thereby formed precipitate of the oligomeric addition polymerization product was separated by filtration and was washed with methanol. This was filtered again and the filter cake was dried under a reduced pressure of at highest 10 mmHg at 25° C. for 5 hours to obtain pale yellow powder.

The thus obtained prepolymer powder was blended dry with various chopped fiber products as indicated in Table 5. The mixture was heated at 140° C. to melt the prepolymer and to cause the fiber to be impregnated with it, in order to obtain a premix for molding. The so obtained premix was charged in a metal mold heated at 230° C. and was press-molded under a pressure of 160 kgf/cm$^2$ over a molding time of 30 minutes. The data for the premix and the material properties of the plastics product are summarized in Table 5.

TABLE 5

| Particulars | Example 19 | Example 20 | Example 21 | Example 22 |
|---|---|---|---|---|
| Diamine (III) used | MDA(*8) | MDA | MDA | MDA |
| (Charge Amount in g) | (39.7) | (39.7) | (39.7) | (39.7) |
| Acid Dianhydride (II) used | BTDA(*9) | BTDA | BTDA | BTDA |
| (Charge Amount in g) | (32.2) | (32.2) | (32.2) | (32.2) |
| N,N'—bismaleimide (IV) used | BMI(*10) | BMI | BMI | BMI |
| (Charge Amount in g) | (71.7) | (71.7) | (71.7) | (53.8) |
| Mole Ratio of (IV)/(I) | 2/1 | 2/1 | 2/1 | 1.5/1 |
| Weight Ratio of (IV)/(I) | 0.997/1.000 | 0.997/1.000 | 0.997/1.000 | 0.748/1.000 |
| Reinforcement Fiber used | CF(*11) | GF(*12) | AF(*13) | CF |
| (Av. Filament Length in mm) | (6.0) | (6.0) | (6.0) | (6.0) |
| Fiber Content in Plastics(*1) | 50 | 50 | 50 | 50 |
| Flexur. Streng. (kgf/mm$^2$)(*2) | 24.8 | 20.0 | 12.9 | 17.5 |
| Tensile Streng. (kgf/mm$^2$)(*3) | 9.8 | 9.3 | 6.2 | 9.0 |
| Izod Impact Strength (with Notch) (kgf · cm/cm$^2$)(*4) | 23.8 | 22.6 | 21.6 | 23.2 |
| % Retention of Flex. Str.(*5) | 81 | 80 | 77 | 79 |
| HDT (°C.)(*6) | 300< | 300< | 300< | 300< |
| Volume Resistivity (Ω · cm) | — | 7.4 × 10$^{15}$ | — | — |
| Dielectric Constant at 1 MHz | — | 3.3 | — | — |
| Dielectric Loss (tan δ) at 1 MHz | — | 0.8 × 10$^{-2}$ | — | — |
| Dielect. Breakdown Strength (KV/mm) | — | 14.4 | — | — |
| Tabor Abrasion Loss (mg) | 54 | 54 | 55 | 57 |
| Occurrence of Microcracks(*7) | None | None | None | None |

| Particulars | Example 23 | Example 24 | Example 25 | Example 26 |
|---|---|---|---|---|
| Diamine (III) used | MDA(*8) | MDA | ODA(*14) | MDA |
| (Charge Amount in g) | (39.7) | (39.7) | (40.1) | (39.7) |
| Acid Dianhydride (II) used | BTDA(*9) | BTDA | BTDA | PMDA(*15) |
| (Charge Amount in g) | (32.2) | (32.2) | (32.2) | (21.8) |
| N,N'—bismaleimide (IV) used | BMI(*10) | OMI(*16) | BMI | BMI |
| (Charge Amount in g) | (35.9) | (36.3) | (71.7) | (71.7) |
| Mole Ratio of (IV)/(I) | 1/1 | 2/1 | 2/1 | 2/1 |
| Weight Ratio of (IV)/(I) | 0.499/1.000 | 1.003/1.000 | 0.992/1.000 | 1.166/1.000 |
| Reinforcement Fiber used | CF(*11) | CF | CF | CF |
| (Av. Filament Length in mm) | (6.0) | (6.0) | (6.0) | (6.0) |
| Fiber Content in Plastics(*1) | 50 | 50 | 50 | 50 |
| Flexur. Streng. (kgf/mm$^2$)(*2) | 14.0 | 25.7 | 25.0 | 30.6 |
| Tensile Streng. (kgf/mm$^2$)(*3) | 6.3 | 9.5 | 9.1 | 8.2 |
| Izod Impact Strength (with Notch) (kgf · cm/cm$^2$)(*4) | 22.5 | 21.2 | 21.5 | 20.6 |
| % Retention of Flex. Str.(*5) | 79 | 83 | 83 | 85 |
| HDT (°C.)(*6) | 300< | 300< | 300< | 300< |
| Volume Resistivity (Ω · cm) | — | — | — | — |
| Dielectric Constant at 1 MHz | — | — | — | — |
| Dielectric Loss (tan δ) at 1 MHz | — | — | — | — |
| Dielect. Breakdown Strength (KV/mm) | — | — | — | — |
| Tabor Abrasion Loss (mg) | 59 | 55 | 56 | 51 |

TABLE 5-continued

| Occurrence of Microcracks(*7) | None | None | None | None |
|---|---|---|---|---|
| Particulars | Example 27 | Example 28 | Example 29 | Example 30 |
| Diamine (III) used | MDA(*8) | MDA | MDA | MDA |
| (Charge Amount in g) | (39.7) | (39.7) | (39.7) | (39.7) |
| Acid Dianhydride (II) used | BTDA(*9) | BTDA | BTDA | BTDA |
| (Charge Amount in g) | (32.2) | (32.2) | (32.2) | (32.2) |
| N,N'—bismaleimide (IV) used | BMI(*10) | BMI | BMI | BMI |
| (Charge Amount in g) | (71.7) | (71.7) | (107.6) | (71.7) |
| Mole Ratio of (IV)/(I) | 2/1 | 2/1 | 3/1 | 2/1 |
| Weight Ratio of (IV)/(I) | 0.997/1.000 | 0.997/1.000 | 1.496/1.000 | 0.997/1.000 |
| Reinforcement Fiber used | CF(*11) | CF | CF | CF |
| (Av. Filament Length in mm) | (6.0) | (12.0) | (6.0) | (6.0) |
| Fiber Content in Plastics(*1) | 80 | 50 | 50 | 100 |
| Flexur. Streng. (kgf/mm$^2$)(*2) | 25.9 | 24.8 | 31.5 | 35.0 |
| Tensile Streng. (kgf/mm$^2$)(*3) | 9.0 | 10.0 | 8.5 | 12.0 |
| Izod Impact Strength (with Notch) (kgf·cm/cm$^2$)(*4) | 26.6 | 24.0 | 18.4 | 29.5 |
| % Retention of Flex. Str.(*5) | 82 | 80 | 90 | 89 |
| HDT (°C.)(*6) | 300< | 300< | 300< | 300< |
| Volume Resistivity (Ω·cm) | — | — | — | — |
| Dielectric Constant at 1 MHz | — | — | — | — |
| Dielectric Loss (tan δ) at 1 MHz | — | — | — | — |
| Dielect. Breakdown Strength (KV/mm) | — | — | — | — |
| Tabor Abrasion Loss (mg) | 50 | 54 | 53 | 48 |
| Occurrence of Microcracks(*7) | None | None | None | None |

| Particulars | Example 31(*17) | Example 32(*18) |
|---|---|---|
| Diamine (III) used | MDA(*8) | MDA |
| (Charge Amount in g) | (39.7) | (39.7) |
| Acid Dianhydride (II) used | BTDA(*9) | BTDA |
| (Charge Amount in g) | (32.2) | (32.2) |
| N,N'—bismaleimide (IV) used | BMI(*10) | BMI |
| (Charge Amount in g) | (71.7) | (71.7) |
| Mole Ratio of (IV)/(I) | 2/1 | 2/1 |
| Weight Ratio of (IV)/(I) | 0.997/1.000 | 0.997/1.000 |
| Reinforcement Fiber used | CF(*11) | CF |
| (Av. Filament Length in mm) | (6.0) | (6.0) |
| Fiber Content in Plastics(*1) | 50 | 50 |
| Flexur. Streng. (kgf/mm$^2$)(*2) | 25.8 | 25.0 |
| Tensile Streng. (kgf/mm$^2$)(*3) | 10.1 | 9.6 |
| Izod Impact Strength (with Notch) (kgf·cm/cm$^2$)(*4) | 23.0 | 23.4 |
| % Retention of Flex. Str.(*5) | 84 | 83 |
| HDT (°C.)(*6) | 300< | 300< |
| Volume Resistivity (Ω·cm) | — | — |
| Dielectric Constant at 1 MHz | — | — |
| Dielectric Loss (tan δ) at 1 MHz | — | — |
| Dielect. Breakdown Strength (KV/mm) | — | — |
| Tabor Abrasion Loss (mg) | 53 | 55 |
| Occurrence of Microcracks(*7) | None | None |

Notes in Table 5:
(*1)Weight part of fiber per 100 parts of resin
(*2)JIS K6911
(*3)JIS K6911
(*4)JIS K7110
(*5)% retent. = 100 × [Flex. Strength at 200° C.]/[Flex. Strength at 20° C.]
(*6)Heat distortion temperature
(*7)Inspection under microscope
(*8)4,4'-Diaminophenylmethane
(*9)3,3',4,4'-Benzophenonetetracarboxylic
(*10)N,N'—4,4'-diphenylmethanebismaleimide
(*11)Carbon fiber Torayca Chopped Fiber T008A (trademark) of Toray Ind., Ltd.
(*12)Glass fiber Glasron CS06 MAPX-1 (trademark) of Asahi Fiber Glass Co. Ltd.
(*13)Aramid fiber Conex (trademark) of Teijin Ltd.
(*14)4,4'-Diaminodiphenyl ether
(*15)Pyromellitic dyanhydride
(*16)N,N'—4,4'-Diphenyl ether bismaleimide
(*17)With addition of DABCO (1 wt. % of resin solids)
(*18)With addition of 2-methylimidazole (1 wt. % of resin solids)

As is clear from Table 5, the plastics products of Examples 19-32 have superior material properties and show especially a remarkable increase in the bending strength, tensile strength and Izod impact strength over the prior art products. These products did not show any occurrence of internal microcracks even by inspection under a microscope.

COMPARISON EXAMPLES 5-7

Using a resin N,N'-4,4'-diphenylmethanebismaleimide/4,4'-diaminodiphenylmethane=2/1 (mole ratio) [a commercial product Kerimide 601 (trademark) of the firm Rhone-Poulenc S.A.], molded products were produced under the same molding condition as in Examples 19-32. The material properties of the thus molded plastics were determined, which are summarized in Table 6. Inspection of the material inside of the molded plastics under a microscope showed occurrence of microcracks at around the interface between the reinforcement fiber and the matrix resin.

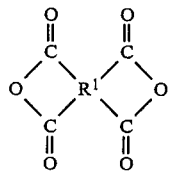
(II)

TABLE 6

| Particulars | Comparison Example 5 | Comparison Example 6 | Comparison Example 7 |
|---|---|---|---|
| Diamine (III) used | MDA(*8) | MDA | MDA |
| (Charge Amount in g) | (19.8) | (19.8) | (19.8) |
| N,N'—bismaleimide (IV) used | BMI(*10) | BMI | BMI |
| (Charge Amount in g) | (71.7) | (71.7) | (71.7) |
| Mole Ratio of (IV)/(III) | 2/1 | 2/1 | 2/1 |
| Weight Ratio of (IV)/(III) | 3.615/1.000 | 3.615/1.000 | 3.615/1.000 |
| Reinforcement Fiber used | CF(*11) | GF(*12) | CF |
| (Av. Filament Length in mm) | (6.0) | (6.0) | (12.0) |
| Fiber Content in Plastics(*1) | 50 | 50 | 50 |
| Flexur. Streng. (kgf/mm$^2$)(*2) | 19.5 | 16.5 | 23.0 |
| Tensile Streng. (kgf/mm$^2$)(*3) | 5.8 | 5.3 | 5.0 |
| Izod Impact Strength (with Notch) (kgf.cm/cm$^2$)(*4) | 15.7 | 14.9 | 16.5 |
| % Retention of Flex. Str.(*5) | 84 | 81 | 84 |
| HDT (°C.)(*6) | 300< | 300< | 300< |
| Volume Resistivity (Ω · cm) | — | $7.4 \times 10^{15}$ | — |
| Dielectric Constant at 1 MHz | — | 3.5 | — |
| Dielectric Loss (tan δ) at 1 MHz | — | $0.9 \times 10^{-5}$ | — |
| Dielect. Breakdown Strength (KV/mm) | — | 11.0 | — |
| Tabor Abrasion Loss (mg) | 55 | 57 | 56 |
| Occurrence of Microcracks(*7) | found | found | found |

Notes:
(*1)Weight part of fiber per 100 parts of resin
(*2)JIS K6911
(*3)JIS K6911
(*4)JIS K7110
(*5)% retent. = 100 × [Flex. Strength at 200° C.]/[Flex. Strength at 20° C.]
(*6)Heat distortion temperature
(*7)Inspection under microscope
(*8)4,4'-Diaminophenylmethane
(*10)N,N'-4,4'-diphenylmethanebismaleimide
(*11)Carbon fiber Torayca Chopped Fiber T008A (trademark) of Toray Ind., Ltd.
(*12)Glass fiber Glasron CS06 MAPX-1 (trademark) of Asahi Fiber Glass Co. Ltd.

As seen in Tables 5 and 6, the prior art products of Comparison Examples 5-7 showed occurrence of microcracks, whereas the products of Examples 19-32 did show no occurrence of microcracks and showed a marked increase in the bending strength, tensile strength and Izod impact strength.

What is claimed is:

1. A premix for a thermosetting resin, comprising, as a first essential component, an amine-terminated amic acid expressed by the formula (I).

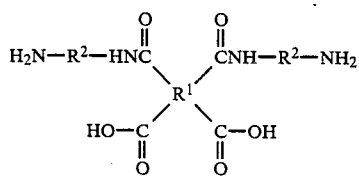
(I)

in which $R^1$ denotes a tetravalent aromatic residue having 6 to 20 carbon atoms and $R^2$ denotes a divalent organic residue having 2 to 20 carbon atoms, said amic acid being produced by reacting a tetracarboxylic dianhydride represented by the formula (II), wherein $R^1$ has the same meaning as defined above, with a diamine compound represented by the formula (III), $$H_2N-R^2-NH_2 \quad (III)$$

wherein $R^2$ has the same meaning as defined above, and, as a second essential component, an N,N'-bismaleimide of the formula (IV),

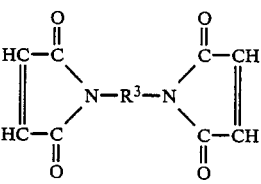
(IV)

wherein $R^3$ denotes a divalent organic residue having 2 to 20 carbon atoms, the mole ratio of [N,N'-bismaleimide]/[amine-terminated amic acid] being in the range from 1 to 3.

2. A prepolymer for a thermosetting resin, comprising a product of a limited addition polymerization effected with a premix which comprises, as a first essential component, an amine-terminated amic acid expressed by the formula (I),

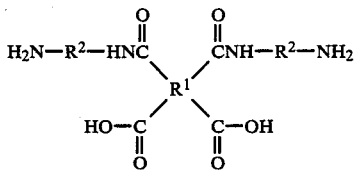

in which R¹ denotes a tetravalent aromatic residue having 6 to 20 carbon atoms and R² denotes a divalent organic residue having 2 to 20 carbon atoms, said amic acid being produced by reacting a tetracarboxylic dianhydride represented by the formula (II),

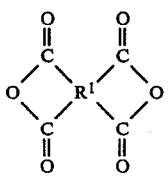

wherein R¹ has the same meaning as defined above, with a diamine compound represented by the formula (III),

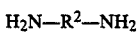

wherein R² has the same meaning as defined above, and, as a second essential component, an N,N'-bismaleimide of the formula (IV),

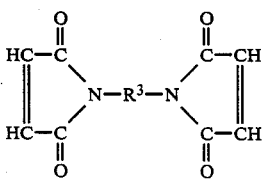

wherein R³ denotes a divalent organic residue having 2 to 20 carbon atoms, the mole ratio of [N,N'-bismaleimide]/[amine-terminated amic acid] being in the range from 1 to 3.

3. A thermosetting resin, comprising a cured polymerization product resulting from addition polymerization effected either with a premix comprising, as a first essential component, an amine-terminated amic acid expressed by the formula (I),

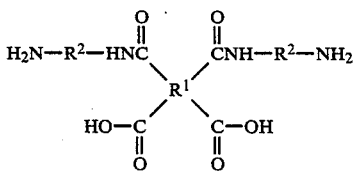

in which R¹ denotes a tetravalent aromatic residue having 6 to 20 carbon atoms and R² denotes a divalent organic residue having 2 to 20 carbon atoms, said amic acid being produced by reacting a teracarboxylic dianhydride represented by the formula (II),

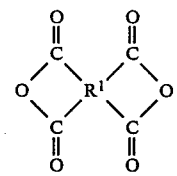

wherein R¹ has the same meaning as defined above, with a diamine compound represented by the formula (III),

wherein R² has the same meaning as defined above, and, as a second essential component, an N,N'-bismaleimide of the formula (IV),

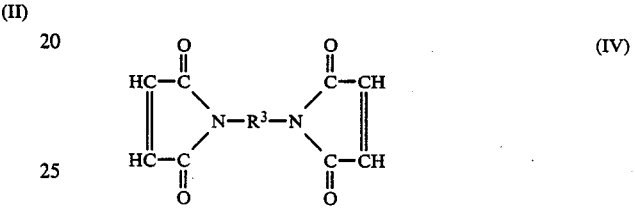

wherein R³ denotes a divalent organic residue having 2 to 20 carbon atoms, the mole ratio of [N,N'-bismaleimide]/[amine-terminated amic acid] being in the range from 1 to 3, or with a prepolymer resulting from a limited addition polymerization effected with said premix.

4. Fiber reinforced plastic comprising a reinforcement ingredient of fiber and a thermosetting resin matrix consisting essentially of a cured polymerization product obtained by addition polymerization from (1), a premix which comprises, as a first essential component, an amine-terminated amic acid expressed by the formula (I),

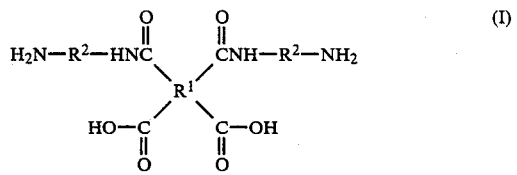

in which R¹ denotes a tetravalent aromatic residue having 6 to 20 carbon atoms and R² denotes a divalent organic residue having 2 to 20 carbon atoms, said amic acid being produced by reacting a tetracarboxylic dianhydride represented by the formula (II),

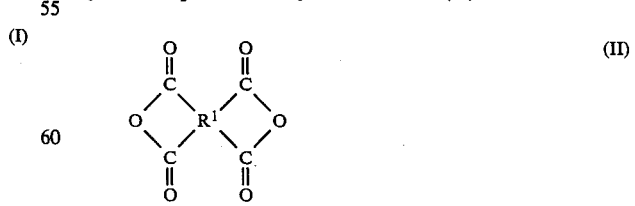

wherein R¹ has the same meaning as defined above, with a diamine compound represented by the formula (III),

wherein $R^2$ has the same meaning as defined above, and, as a second essential component, an N,N'-bismaleimide of the formula (IV),

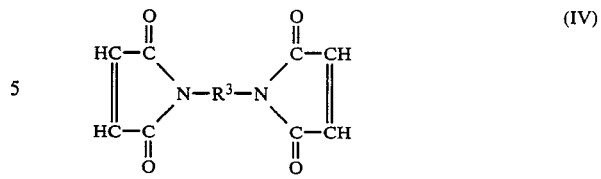

wherein $R^3$ denotes a divalent organic residue having 2 to 20 carbon atoms, the mole ratio of [N,N'-bismaleimide]/[amine-terminated amic acid] being in the range from 1 to 3, or (2) a prepolymer resulting from a limited addition polymerization effected with said premix.

5. Fiber reinforced plastic according to claim 4, wherein the fiber is selected from the group consisting of short and long filament fibers of glass, carbon, aramid resin, alumina or potassium titanate or woven or unwoven cloths of such fibers.

* * * * *